United States Patent
Takeshita et al.

(10) Patent No.: US 11,407,888 B2
(45) Date of Patent: Aug. 9, 2022

(54) ETHYLENE-VINYL ALCOHOL COPOLYMER COMPOSITION, PELLETS, AND MULTILAYER STRUCTURE

(71) Applicant: MITSUBISHI CHEMICAL CORPORATION, Tokyo (JP)

(72) Inventors: Keisuke Takeshita, Tokyo (JP); Takuya Nakajima, Tokyo (JP); Daichi Nishimura, Tokyo (JP)

(73) Assignee: MITSUBISHI CHEMICAL CORPORATION, Tokyo (JP)

(\*) Notice: Subject to any disclaimer, the term of this patent is extended or adjusted under 35 U.S.C. 154(b) by 0 days.

(21) Appl. No.: 16/724,793

(22) Filed: Dec. 23, 2019

(65) Prior Publication Data

US 2020/0123372 A1 Apr. 23, 2020

Related U.S. Application Data

(63) Continuation of application No. PCT/JP2018/024310, filed on Jun. 27, 2018.

(30) Foreign Application Priority Data

Jun. 27, 2017 (JP) .............................. JP2017-124869

(51) Int. Cl.
```
C08L 29/04      (2006.01)
B32B 27/08      (2006.01)
B32B 27/30      (2006.01)
C08K 3/11       (2018.01)
C08K 5/01       (2006.01)
```

(52) U.S. Cl.
CPC ............. *C08L 29/04* (2013.01); *B32B 27/08* (2013.01); *B32B 27/306* (2013.01); *C08K 3/11* (2018.01); *C08K 5/01* (2013.01)

(58) Field of Classification Search
CPC ........ C08L 29/04; C08K 3/11; C08K 2003/2265; C08K 2003/2268; C08K 2003/2272; C08K 2003/2275
See application file for complete search history.

(56) References Cited

U.S. PATENT DOCUMENTS

| | | |
|---|---|---|
| 6,759,107 B1 | 7/2004 | Tai et al. |
| 2018/0208750 A1 | 7/2018 | Komuro et al. |
| 2018/0362728 A1 | 12/2018 | Komuro et al. |

FOREIGN PATENT DOCUMENTS

| | | | |
|---|---|---|---|
| JP | S63-069867 | 3/1988 | |
| JP | H07-330994 | 12/1995 | |
| JP | 2005-082226 A | 3/2005 | |
| JP | 2008-230112 | 10/2008 | |
| WO | 2013/146533 | 10/2013 | |
| WO | WO-2013146533 A1 \* | 10/2013 | ............... C08J 5/18 |
| WO | 2016/199827 | 12/2016 | |
| WO | WO-2016199827 A1 \* | 12/2016 | ............. B32B 27/28 |
| WO | 2017/104673 | 6/2017 | |
| WO | WO-2017104673 A1 \* | 6/2017 | ............... C08K 3/16 |

OTHER PUBLICATIONS

Machine-generated English-language translation of WO-2013146533-A1.\*
European Search Report issued in European Patent Application No. 18825237.3 dated Jun. 5, 2020.
ISR issued in International Bureau of WIPO Patent Application No. PCT/JP2016/089122, dated Feb. 7, 2017, English translation.
IPRP issued in International Bureau of WIPO Patent Application No. PCT/JP2016/089122, dated Jul. 3, 2018, English translation.
ISR issued in International Bureau of WIPO Patent Application No. PCT/JP2018/024310, dated Oct. 2, 2018, English translation.
IPRP issued in International Bureau of WIPO Patent Application No. PCT/JP2018/024310, dated Dec. 31, 2020, English translation.
Office Action issued in Singapore Counterpart Patent Appl. No. 11201804720P, dated Jun. 26, 2019.
Singaporean Office Action issued in SG Patent App. No. 11201913341W, dated Nov. 9, 2020.
Office Action issued in JP Patent Application No. 2018-534191, dated Oct. 26, 2021, English translation.
Office Action issued in CN Patent Application No. 201880042536.6, dated Sep. 28, 2021, English translation.

\* cited by examiner

*Primary Examiner* — Vu A Nguyen
(74) *Attorney, Agent, or Firm* — Greenblum & Bernstein, P.L.C.

(57) ABSTRACT

An ethylene-vinyl alcohol copolymer composition contains: (A) an ethylene-vinyl alcohol copolymer; (B) a styrene derivative; and (C) an iron compound; wherein the iron compound (C) is present in an amount of 0.01 to 5 ppm on a metal basis based on the weight of the ethylene-vinyl alcohol copolymer composition. The ethylene-vinyl alcohol copolymer composition has ultraviolet absorbability even without a known ultraviolet-absorbing agent blended therein, and is excellent in heat stability and reduced susceptibility to coloration.

6 Claims, No Drawings

ETHYLENE-VINYL ALCOHOL COPOLYMER COMPOSITION, PELLETS, AND MULTILAYER STRUCTURE

RELATED APPLICATION

This application is a continuation of International Application No. PCT/JP2018/024310, filed on Jun. 27, 2018, which claims priority to Japanese Patent Application No. 2017-124869, filed on Jun. 27, 2017, the entire contents of each of which being hereby incorporated by reference.

TECHNICAL FIELD

The present disclosure relates to an ethylene-vinyl alcohol copolymer composition containing an ethylene-vinyl alcohol copolymer (hereinafter referred to simply as "EVOH resin") as a major component, pellets formed from the EVOH resin composition, and a multilayer structure including a layer formed from the EVOH resin composition. More specifically, the present disclosure relates to an EVOH resin composition having ultraviolet absorbability, pellets formed from the EVOH resin composition, and a multilayer structure including a layer formed from the EVOH resin composition.

BACKGROUND ART

The EVOH resin is excellent in transparency, gas barrier properties such as oxygen barrier property, aroma retaining property, solvent resistance, oil resistance, and mechanical strength, and is formed into films, sheets, bottles, and the like, which are widely used as various packaging materials such as food packaging materials, pharmaceutical product packaging materials, industrial chemical packaging materials, and agricultural chemical packaging materials.

However, the packaging materials are often required to have ultraviolet absorbability, because foods, chemicals, and the like are liable to be deteriorated or degenerated by ultraviolet radiation. A typical method for imparting the packaging materials with the ultraviolet absorbability is to blend an ultraviolet absorbing agent in a resin to be used for the packaging materials. For example, a laminate structure including a polyolefin layer and an EVOH resin layer laminated together is proposed, in which the ultraviolet absorbing agent is kneaded with a material for at least one of these layers to reduce ultraviolet transmittance (see, for example, PTL 1).

RELATED ART DOCUMENT

Patent Document

PTL 1: JP-A-2008-230112

SUMMARY

However, the ultraviolet absorbing agent is generally a low-molecular-weight compound and, therefore, is liable to migrate in a resin product formed from the resin. That is, the ultraviolet absorbing agent is problematically liable to migrate to a layer surface during use of the formed product to be thereby brought into contact with a content packaged with the formed product or to make the surface sticky. In order to impart the resin with sufficient ultraviolet absorbability, it is necessary to add a great amount of the ultraviolet absorbing agent to the resin. This tends to deteriorate the properties of the resin.

To solve the problem, the inventors came up with an idea of using an iron compound when providing an EVOH resin composition having excellent ultraviolet absorbability without blending a known ultraviolet absorbing agent. Where the iron compound is blended in the EVOH resin composition, the EVOH resin composition is improved in ultraviolet absorbability and heat stability proportionally with the amount of the iron compound blended therein, but tends to be colored during melt forming.

That is, the present disclosure provides an EVOH resin composition, pellets, and a multilayer structure, which have ultraviolet absorbability even without the known ultraviolet absorbing agent blended therein, and are excellent in heat stability and less susceptible to the coloration.

In view of the foregoing, the inventors conducted intensive studies and, as a result, found that, where a specific very small amount of an iron compound and a styrene derivative are used in combination with the EVOH resin, the resulting resin composition has ultraviolet absorbability, and is excellent in heat stability and less susceptible to the coloration. Thus, the inventors attained the present disclosure.

According to a first aspect of the present disclosure, there is provided an EVOH resin composition containing: (A) an EVOH resin; (B) a styrene derivative; and (C) an iron compound; wherein the iron compound (C) is present in an amount of 0.01 to 5 ppm on a metal basis based on the weight of the EVOH resin composition. According to a second aspect of the present disclosure, pellets formed from the EVOH resin composition are provided. According to a third aspect of the present disclosure, a multilayer structure including a layer formed from the EVOH resin composition is provided.

The EVOH resin composition of the present disclosure contains the EVOH resin (A), the styrene derivative (B), and the iron compound (C). In the EVOH resin composition, the iron compound (C) is present in an amount of 0.01 to 5 ppm on a metal basis based on the weight of the EVOH resin composition. The EVOH resin composition of the present disclosure has ultraviolet absorbability even without the use of the ultraviolet absorbing agent that is liable to cause the surface migration and deteriorate the resin properties. In addition, the EVOH resin composition is excellent in heat stability, and less susceptible to the coloration during the heating.

Where the styrene derivative (B) is present in an amount of 1 to 1,000 ppm based on the weight of the EVOH resin composition in the present disclosure, the EVOH resin composition is superior in ultraviolet absorbability and heat stability, and less susceptible to the coloration during the heating.

Where the weight ratio of the amount of the styrene derivative (B) to the amount of the iron compound (C) on a metal basis is 0.2 to 50,000 in the present disclosure, the EVOH resin composition is further improved in ultraviolet absorbability and heat stability, and is still less susceptible to the coloration during the heating.

The pellets formed from the EVOH resin composition of the present disclosure have ultraviolet absorbability, and are excellent in heat stability and less susceptible to the coloration during the heating. Therefore, the pellets can be advantageously used as a material for packaging materials.

The multilayer structure including the layer formed from the EVOH resin composition of the present disclosure has ultraviolet absorbability, and is excellent in heat stability and less susceptible to the coloration during the heating. Therefore, the multilayer structure is particularly useful for food packaging materials.

DESCRIPTION OF EMBODIMENTS

Preferred embodiments of the present disclosure will hereinafter be described in detail. It should be understood that these preferred embodiments are illustrative but not limitative.

An EVOH resin composition of the present disclosure contains: (A) an EVOH resin as a major component; (B) a styrene derivative; and (C) an iron compound. The EVOH resin composition of the present disclosure contains the EVOH resin (A) as a base resin. In the EVOH resin composition, the proportion of the EVOH resin (A) is typically not less than 70 wt. %, preferably not less than 80 wt. %, more preferably not less than 90 wt. %, particularly preferably not less than 95 wt. %.

The respective components will hereinafter be described in turn.

EVOH Resin (A)

The EVOH resin (A) to be used in the present disclosure is a water-insoluble thermoplastic resin typically prepared by saponifying a copolymer of ethylene and a vinyl ester monomer, i.e., an ethylene-vinyl ester copolymer. Vinyl acetate is generally used as the vinyl ester monomer for economy.

A known polymerization method such as solution polymerization method, suspension polymerization method or emulsion polymerization method may be utilized for polymerization of ethylene and the vinyl ester monomer. In general, a solution polymerization method using methanol as a solvent is utilized. The saponification of the resulting ethylene-vinyl ester copolymer may be achieved by a known method.

The EVOH resin (A) thus prepared mainly contains an ethylene structural unit and a vinyl alcohol structural unit, and further contains a small amount of a vinyl ester structural unit left unsaponified.

Vinyl acetate is typically used as the vinyl ester monomer, because it is easily commercially available and ensures a higher impurity treatment efficiency in the preparation. Other examples of the vinyl ester monomer include aliphatic vinyl esters such as vinyl formate, vinyl propionate, vinyl valerate, vinyl butyrate, vinyl isobutyrate, vinyl pivalate, vinyl caprate, vinyl laurate, vinyl stearate, and vinyl versatate, and aromatic vinyl esters such as vinyl benzoate. The aliphatic vinyl esters typically have a carbon number of 3 to 20, preferably 4 to 10, particularly preferably 4 to 7. These vinyl esters may be typically each used alone or, as required, a plurality of vinyl esters may be selected from these vinyl esters to be used in combination.

The ethylene structural unit content of the EVOH resin (A) can be controlled by adjusting the pressure of ethylene to be supplied when the vinyl ester monomer and ethylene are copolymerized. The ethylene structural unit content of the EVOH resin (A) is typically 20 to 60 mol %, preferably 25 to 50 mol %, particularly preferably 28 to 45 mol %. If the ethylene structural unit content is excessively low, the high-humidity gas barrier property and the stretchability tend to be deteriorated. If the ethylene structural unit content is excessively high, on the other hand, the gas barrier property tends to be deteriorated.

The ethylene structural unit content may be measured in conformity with IS014663.

The vinyl ester saponification degree of the EVOH resin (A) can be controlled by adjusting the amount of a saponification catalyst (typically, an alkaline catalyst such as sodium hydroxide), a saponification temperature, a saponification period, and the like for the saponification of the ethylene-vinyl ester copolymer. The saponification degree is typically 90 to 100 mol %, preferably 95 to 100 mol %, particularly preferably 99 to 100 mol %. If the saponification degree is excessively low, the gas barrier property, the heat stability, the humidity resistance, and the like tend to be deteriorated.

The saponification degree of the EVOH resin (A) may be measured in conformity with JIS K6726 (with the use of a solution obtained by homogenously dissolving the EVOH resin in a water/methanol solvent).

The EVOH resin (A) typically has a melt flow rate (MFR) of 0.5 to 100 g/10 minutes, preferably 1 to 50 g/10 minutes, particularly preferably 3 to 35 g/10 minutes (as measured at 210° C. with a load of 2160 g). If the MFR of the EVOH resin (A) is excessively high, the film formability tends to be unstable. If the MFR of the EVOH resin (A) is excessively low, the EVOH resin composition tends to have an excessively high viscosity, making melt extrusion difficult.

The MFR, which is an index of the polymerization degree of the EVOH resin, can be controlled by adjusting the amount of a polymerization initiator and the amount of the solvent in the copolymerization of ethylene and the vinyl ester monomer.

The EVOH resin (A) to be used in the present disclosure may further contain a structural unit derived from any of the following comonomers in an amount (e.g., not greater than 10 mol % of the EVOH resin (A)) that does not impair the effects of the present disclosure.

The comonomers include: olefins such as propylene, 1-butene, and isobutene, hydroxyl-containing α-olefins such as 3-buten-1-ol, 3-butene-1,2-diol, 4-penten-1-ol, and 5-hexene-1,2-diol, and derivatives including esterification products and acylation products of these hydroxyl-containing α-olefins; hydroxyalkyl vinylidenes such as 2-methylenepropane-1,3-diol and 3-methylenepentane-1,5-diol; hydroxyalkyl vinylidene diacetates such as 1,3-diacetoxy-2-methylenepropane, 1,3-dipropionyloxy-2-methylenepropane, and 1,3-dibutyryloxy-2-methylenepropane; unsaturated acids such as acrylic acid, methacrylic acid, crotonic acid, phthalic acid (anhydride), maleic acid (anhydride), and itaconic acid (anhydride), salts of these unsaturated acids, and monoalkyl and dialkyl esters of these unsaturated acids each including a C1- to C18-alkyl group; acrylamide compounds such as acrylamide, N-alkylacrylamides each including a C1- to C18-alkyl group, N,N-dimethylacrylamide, 2-acrylamidopropane sulfonic acid and its salts, and acrylamidopropyldimethylamine and its acid salts and quaternary salts; methacrylamide compounds such as methacrylamide, N-alkylmethacrylamides each including a C1- to C18-alkyl group, N,N-dimethylmethacrylamide, 2-methacrylamidopropane sulfonic acid and its salts, and methacrylamidopropyldimethylamine and its acid salts and quaternary salts; N-vinylamides such as N-vinylpyrrolidone, N-vinylformamide, and N-vinylacetamide; vinyl cyanates such as acrylonitrile and methacrylonitrile; vinyl ethers each including a C1- to C18-alkyl group such as alkyl vinyl ethers, hydroxyalkyl vinyl ethers, and alkoxyalkyl vinyl ethers; halogenated vinyl compounds such as vinyl chloride, vinylidene chloride, vinyl fluoride, vinylidene fluoride, and vinyl bromide; vinylsilanes such as trimethoxyvinylsilane;

allyl acetate, and halogenated allyl compounds such as allyl chloride; allyl alcohol compounds such as allyl alcohol and dimethoxyallyl alcohol; and trimethyl(3-acrylamido-3-dimethylpropyl)ammonium chloride and acrylamido-2-methylpropane sulfonic acid. These may be used alone or in combination.

An EVOH resin having a primary hydroxyl group in its side chain is particularly preferred because it is possible to improve the secondary formability while ensuring the gas barrier property. Particularly, an EVOH resin prepared by copolymerization with the hydroxyl-containing α-olefin is preferred, and an EVOH resin having a 1,2-diol structure in its side chain is especially preferred.

Particularly, where the EVOH resin having a primary hydroxyl group in its side chain is used, the content of a structural unit derived from a monomer having the primary hydroxyl group is typically 0.1 to 20 mol %, preferably 0.5 to 15 mol %, particularly preferably 1 to 10 mol % of the resin.

The EVOH resin (A) to be used in the present disclosure may be a post-modified EVOH resin such as a urethanized, acetalized, cyanoethylated or oxyalkylenated EVOH resin.

The EVOH resin (A) to be used in the present disclosure may be a mixture of different EVOH resins. These EVOH resins may have different ethylene structural unit contents, different saponification degrees, and different polymerization degrees, and contain different comonomer components.

Styrene Derivative (B)

The styrene derivative (B) to be used in the present disclosure is an aromatic compound capable of resonance-stabilizing and capturing radicals and, more specifically, is a compound having a styrene molecular structure as its molecular skeleton. The styrene derivative (B) is preferably a styrene compound having a substituent at the α-position or the β-position.

The styrene compound having a substituent at the α-position, for example, is preferred because radicals are resonance-stabilized at the benzyl position. A specific example of such a styrene compound is 2,4-diphenyl-4-methyl-1-pentene. The styrene compound having a substituent at the β-position is preferred because a styrene compound having a carbonyl group at the β-position, for example, has an enone structure and resonance-stabilizes radicals. Examples of such a styrene compound include cinnamic acid, and cinnamic acid derivatives such as cinnamyl alcohol, cinnamic acid esters, and cinnamic acid salts. Of these, cinnamic acid is most preferred.

The styrene derivative (B) typically has a molecular weight of 100 to 100,000, preferably 100 to 10,000, particularly preferably 100 to 1,000, especially preferably 130 to 300. Where the molecular weight of the styrene derivative (B) falls within the aforementioned range, the effects of the present disclosure can be more efficiently provided.

The amount of the styrene derivative (B) contained in the EVOH resin composition of the present disclosure is typically 1 to 1,000 ppm, preferably 10 to 800 ppm, particularly preferably 50 to 600 ppm, based on the weight of the overall EVOH resin composition. If the amount of the styrene derivative (B) is excessively great, the productivity tends to be deteriorated. If the amount of the styrene derivative (B) is excessively small, the heat stability tends to be deteriorated.

The amount of the styrene derivative (B) is based on the EVOH resin composition as a final product that contains the EVOH resin (A), the styrene derivative (B), the iron compound (C), and optional additives.

The amount of the styrene derivative (B) contained in the EVOH resin composition of the present disclosure may be measured in the following procedure, for example, by a liquid chromatography/mass spectrometry method (LC/MS/MS). The following procedure is directed to the measurement of the amount of cinnamic acid by way of example, but is applicable to the measurement of the amount of other styrene derivative (B).

Method of Measuring Amount of Styrene Derivative (B)

Preparation of Standard Solutions

Cinnamic acid (10.89 mg) is weighed in a 10-mL measuring flask, and dissolved in methanol, whereby a 10-mL solution (standard stock solution having a concentration of 1,089 μg/mL) is prepared. Then, the standard stock solution thus prepared is diluted with methanol, whereby a plurality of mixed standard solutions having different concentrations (0.109 μg/mL, 0.218 μg/mL, 0.545 μg/mL, 1.09 μg/mL, and 2.18 μg/mL) are prepared. An LC/MS/MS analysis is performed with the use of these mixed standard solutions, whereby a calibration line is prepared.

Preparation of Sample Solution (1) Pellets of the EVOH resin composition of the present disclosure are pulverized, and the pulverized EVOH resin composition (1 g) is weighed in a 10-mL measuring flask. Then, 9 mL of methanol is added to the measuring flask.
(2) The resulting mixture is ultrasonically treated for 120 minutes, and cooled to a room temperature (25° C.)
(3) Methanol is added to the resulting solution to a volume of 10 mL (sample solution (I)).
(4) Then, 1 mL of the sample solution (I) is put in a 10-mL measuring flask, and diluted with methanol to a volume of 10 mL (sample solution (II)).
(5) The sample solution (I) or the sample solution (II) is filtered by a PTFE filter (0.45 μm), and the resulting liquid is used as a measurement solution for the LC/MS/MS analysis.

The detection concentration of cinnamic acid is calculated based on a peak area value detected by the LC/MS/MS analysis and the calibration line prepared by using the standard solutions.

LC/MS/MS Measurement Conditions

LC system: LC-20A (available from Shimadzu Corporation)
Mass spectrometer: API4000 (AB/MDS Sciex)
Analysis column: Scherzo SM-C18 (3.0×75 mm, 3 μm)
Column temperature: 45° C.
Mobile phase: A. 10 mmol/L ammonium acetate aqueous solution
   B. Methanol
Time program: 0.0 to 5.0 minutes B (%)=30% to 95%
   5.0 to 10.0 minutes B (%)=95%
   10.1 to 15.0 minutes B (%)=30%
Flow rate: 0.4 mL/minute
Switch valve: 2.0 to 6.0 minutes: to MS
Injection amount: 5 μL
Ionization: ESI method Detection: Negative ion detection (SRM method)
Ion monitoring: Q1=147.0 to Q3=102.9 (CE: −15 eV)

Iron Compound (C)

A feature of the present disclosure is that the EVOH resin composition contains the EVOH resin (A), the styrene derivative (B), and the iron compound (C), wherein the iron compound (C) is present in a specific very small amount. With this arrangement, the EVOH resin composition has ultraviolet absorbability, and is excellent in heat stability and less susceptible to the coloration.

The iron compound (C) may be present, for example, as iron oxide, iron hydroxide, iron chloride, or iron salt, in an ionized form, or in the form of a complex coordinated with the resin or other ligands in the EVOH resin composition. Examples of the iron oxide include ferric oxide, ferrosoferric oxide, and ferrous oxide. Examples of the iron chloride include ferrous chloride, and ferric chloride. Examples of the iron hydroxide include ferrous hydroxide, and ferric hydroxide. Examples of the iron salt include inorganic iron salts such as iron phosphate and iron sulfate, and organic iron salts such as iron carboxylates (e.g., iron acetate, iron butyrate, iron stearate, and the like). These may be used alone or in combination.

From the viewpoint of dispersibility in the EVOH resin composition, the iron compound (C) is preferably water-soluble. From the viewpoint of the dispersibility and the productivity, the iron compound (C) typically has a molecular weight of 100 to 10,000, preferably 100 to 1,000, particularly preferably 100 to 500.

The amount of the iron compound (C) contained in the EVOH resin composition of the present disclosure is 0.01 to 5 ppm, preferably 0.05 to 3 ppm, particularly preferably 0.08 to 1 ppm, on a metal basis based on the weight of the EVOH resin composition.

If the amount of the iron compound (C) is excessively small, the ultraviolet absorbability tends to be reduced. If the amount of the iron compound (C) is excessively great, a product formed from the EVOH resin composition tends to be colored.

The amount of the iron compound (C) is determined by the following method.

Analysis of Iron Compound (C)

Pellets of the EVOH resin composition is pulverized, and 0.5 g of the pulverized EVOH resin composition is ashed in an oxygen stream at 650° C. for 1 hour in an infrared heating oven. Then, the resulting ash is dissolved in an acid, and the resulting solution is diluted to a predetermined volume with purified water, whereby a sample solution is prepared. The sample solution is analyzed by an ICP mass spectrometer 7500ce available from Agilent Technologies, Inc. through an ICP-MS standard addition method.

In the EVOH resin composition of the present disclosure, the weight ratio of the amount of the styrene derivative (B) to the amount of the iron compound (C) on a metal basis is typically 0.2 to 50,000, preferably 1 to 20,000, particularly preferably 100 to 10,000, especially preferably 1,000 to 8,000. If the weight ratio is excessively high, the ultraviolet absorbability tends to be reduced. If the weight ratio is excessively low, the formed product tends to be colored.

Other Thermoplastic Resin

The EVOH resin composition of the present disclosure may contain a thermoplastic resin other than the EVOH resin (A) in an amount (e.g., typically not greater than 30 wt. %, preferably not greater than 20 wt. %, particularly preferably not greater than 10 wt. %, based on the weight of the EVOH resin composition) that does not impair the effects of the present disclosure.

A known thermoplastic resin may be used as the other thermoplastic resin. Specific examples of the thermoplastic resin include polyamide resins, polyolefin resins, polyester resins, polystyrene resins, polyvinyl chloride resins, polycarbonate resins, polyacrylic resins, ionomers, ethylene-acrylic acid copolymers, ethylene-acrylate copolymers, ethylene-methacrylic acid copolymers, ethylene-methacrylate copolymers, polyvinylidene chlorides, vinyl ester resins, polyester elastomers, polyurethane elastomers, chlorinated polyethylenes, and chlorinated polypropylenes, which may be used alone or in combination.

Other Additives

The EVOH resin composition of the present disclosure may contain additives that are generally blended with the EVOH resin, as long as the effects of the present disclosure are not impaired. Examples of the additives include: inorganic double salt (e.g., hydrotalcites); plasticizer (e.g., aliphatic polyhydric alcohol such as ethylene glycol, glycerin or hexanediol); oxygen absorber [e.g., inorganic oxygen absorber such as aluminum powder, potassium sulfite or photo-catalytic titanium oxide; organic compound oxygen absorber such as ascorbic acid, its fatty acid ester, and its metal salt, polyhydric phenol compound (e.g., hydroquinone, gallic acid, hydroxyl-containing phenol aldehyde resin or the like), coordination compound obtained by coordination-bonding nitrogen-containing compound and non-iron transition metal (e.g., bis-salicylaldehyde-imine cobalt, tetraethylenepentamine cobalt, cobalt-Schiff base complex, porphyrins, macrocyclic polyamine complex, polyethylene-imine-cobalt complex or the like), terpene compound, reaction product obtained by reaction between amino acid and hydroxyl-containing reductive substance, triphenylmethyl compound or the like; or polymer oxygen absorber such as coordination compound obtained by coordination-bonding nitrogen-containing resin and non-iron transition metal (e.g., combination of m-xylenediamine (MXD) nylon and cobalt), blend of tertiary hydrogen-containing resin and non-iron transition metal (e.g., combination of polypropylene and cobalt), blend of unsaturated carbon-carbon bond-containing resin and non-iron transition metal (e.g., combination of polybutadiene and cobalt), photo-oxidation degradative resin (e.g., polyketone), anthraquinone polymer (e.g., polyvinylanthraquinone), or mixture containing any of these blends and photo initiator (benzophenone or the like), other antioxidant or deodorant (active carbon or the like)]; and heat stabilizer, photo stabilizer, UV absorber, colorant, antistatic agent, surfactant (not serving as lubricant), antibacterial agent, antiblocking agent, and filler (e.g., inorganic filler or the like). These compounds may be used alone or in combination.

EVOH Resin Composition Production Method

Known examples of a method of producing the EVOH resin composition of the present disclosure include dry blending method, melt mixing method, solution mixing method, and impregnation method, which may be used in combination.

An example of the dry blending method is a method (i) including the step of dry-blending pellets of the EVOH resin (A) with the styrene derivative (B) and the iron compound (C) by means of a tumbler or the like.

Examples of the melt mixing method include: a method (ii) including the steps of melt-kneading a dry blend of pellets of the EVOH resin (A), the styrene derivative (B), and the iron compound (C), and forming the resulting melt mixture into pellets or a product; and a method (iii) including the steps of adding the styrene derivative (B) and the iron compound (C) to the EVOH resin (A) in a melted state, melt-kneading the resulting mixture, and forming the resulting melt mixture into pellets or a product.

Examples of the solution mixing method include: a method (iv) including the steps of preparing a solution by using commercially available pellets of the EVOH resin (A), adding at least one selected from the group consisting of the styrene derivative (B) and the iron compound (C) to the solution, solidifying and forming the resulting solution into pellets, separating the pellets from the solution, and drying the pellets; and a method (v) including the steps of adding at least one selected from the group consisting of the styrene derivative (B) and the iron compound (C) to an unsaponified ethylene-vinyl ester copolymer solution or a homogeneous solution (water/alcohol solution or the like) of the EVOH resin in the preparation of the EVOH resin (A), solidifying and forming the resulting solution into pellets, separating the pellets from the solution, and drying the pellets.

An example of the impregnation method is a method (vi) including the steps of bringing pellets of the EVOH resin (A) into contact with an aqueous solution containing at least one selected from the group consisting of the styrene derivative (B) and the iron compound (C) to incorporate the at least one selected from the group consisting of the styrene derivative (B) and the iron compound (C) into the pellets of the EVOH resin (A), and then drying the resulting pellets.

In a method (vii), a methanol solution of the EVOH resin (A) containing a non-oxidizable acid (e.g., hydrochloric acid or acetic acid) at a high concentration is transported through a gear pump or the like, whereby a very small amount of an iron compound (C) is released from a stainless steel driving portion of the gear pump into the methanol solution. Thus, the very small amount of the iron compound (C) is incorporated into the EVOH resin (A). Then, EVOH resin pellets containing the EVOH resin (A) and the iron compound (C) are formed from the methanol solution of the EVOH resin (A) subjected to the aforementioned process. The EVOH resin pellets containing the EVOH resin (A) and the iron compound (C) are dry-blended with the styrene derivative (B), and/or melt-kneaded with the styrene derivative (B) and the resulting melt mixture is pelletized. In another exemplary method, the styrene derivative (B) is incorporated to the EVOH resin pellets containing the EVOH resin (A) and the iron compound (C) by the impregnation method, and then the resulting pellets are dried.

In the present disclosure, any of the aforementioned different methods may be used in combination. It is particularly preferred, in terms of the productivity, to add the styrene derivative (B) to a solution of the unsaponified ethylene-vinyl ester copolymer, saponify the ethylene-vinyl ester copolymer by an ordinary method, adjust the solvent of the resulting EVOH resin solution containing the EVOH resin (A) and the styrene derivative (B), as required, by using water, and subject the resulting EVOH resin solution containing the EVOH resin (A) and the styrene derivative (B) to the method (vii). Further, the melt mixing method is preferred, and the method (ii) is particularly preferred, because these methods provide a resin composition significantly improved in productivity and the effects of the present disclosure.

Pellets of the EVOH resin composition of the present disclosure to be produced by any of the aforementioned methods, and the pellets of the EVOH resin (A) to be used in any of the aforementioned methods may each have any desired shape. The pellets may each have, for example, spherical shape, oval shape, cylindrical shape, cubic shape, square prism shape, or the like, and typically the oval shape or the cylindrical shape. The oval pellets typically each have a minor diameter of 1 to 10 mm and a major diameter of 1.5 to 30 mm, preferably a minor diameter of 2 to 6 mm and a major diameter of 3 to 20 mm, more preferably a minor diameter of 2.5 to 5.5 mm and a major diameter of 3.5 to 10 mm, for easy handling thereof in the subsequent use as a forming material. The cylindrical pellets typically each have a bottom diameter of 1 to 6 mm and a length of 1 to 6 mm, preferably a bottom diameter of 2 to 5 mm and a length of 2 to 5 mm.

As described above, a water-soluble iron compound is preferably used as the iron compound (C) in the aforementioned methods. Examples of the iron compound include: iron oxides such as ferric oxide, ferrosoferric oxide, and ferrous oxide; iron chlorides such as ferrous chloride and ferric chloride; iron hydroxides such as ferrous hydroxide and ferric hydroxide; inorganic iron salts such as iron phosphate and iron sulfate; and organic iron salts such as iron carboxylates (e.g., iron acetate, iron butyrate, iron stearate, and the like). As described above, the iron compound (C) may be present in the form of the salt, in an ionized form, or in the form of a complex coordinated with the resin or other compound ligands in the EVOH resin composition.

Usable as the aqueous solution containing the iron compound (C) in the method (vi) are an aqueous solution of any of the aforementioned iron compounds, and an aqueous solution that contains iron ions released from a steel material immersed in water containing chemical agents. In this case, the amount (on a metal basis) of the iron compound (C) to be contained in the EVOH resin composition can be controlled by adjusting the concentration of the iron compound in the aqueous solution in which the pellets of the EVOH resin (A) are immersed, the immersion temperature, the immersion period, and/or the like. The immersion period is typically 0.5 to 48 hours, preferably 1 to 36 hours, and the immersion temperature is typically 10° C. to 40° C., preferably 20° C. to 35° C.

After the immersion, the pellets of the EVOH resin composition are separated from the aqueous solution by a known method, and dried by a known drying method. Various drying methods are usable for the drying, and examples of the drying methods include stationary drying method and fluidized drying method, which may be used alone or in combination.

The pellets of the EVOH resin composition of the present disclosure typically have a water content of 0.01 to 0.5 wt. %, preferably 0.05 to 0.35 wt. %, particularly preferably 0.1 to 0.3 wt. %.

In the present disclosure, the water content of the EVOH resin composition pellets is measured and calculated by the following method.

The weight (W1) of the EVOH resin composition pellets is measured by an electronic balance before the drying, and the EVOH resin composition pellets are dried at 150° C. for 5 hours in a hot air dryer and cooled for 30 minutes in a desiccator. Then, the weight (W2) of the resulting EVOH resin composition pellets is measured. The water content of the EVOH resin composition pellets is calculated from the following expression:

Water content(wt. %)=[(W1−W2)/W1]×100.

The EVOH resin composition pellets thus produced may be used as they are for the melt forming. In order to ensure stable feeding of the EVOH resin composition pellets in the melt forming, it is also preferred to apply a known lubricant to surfaces of the pellets. Examples of the lubricant include: higher fatty acids having a carbon number of not less than 12 (e.g., lauric acid, myristic acid, palmitic acid, stearic acid, behenic acid, and oleic acid); esters of the higher fatty acids (e.g., methyl esters, isopropyl esters, butyl esters, and octyl esters of the higher fatty acids); amides of the higher fatty acids (e.g., saturated higher fatty acid amides such as lauramide, myristamide, palmitamide, stearamide, and behenamide, unsaturated higher fatty acid amides such as oleamide and erucamide, and bis-higher fatty acid amides such as ethylene bis-stearamide, ethylene bis-oleamide, ethylene bis-erucamide, and ethylene bis-lauramide); low-molecular-weight polyolefins (e.g., low-molecular-weight polyethylenes and low-molecular-weight polypropylenes each having a molecular weight of about 500 to about 10,000, and acid modification products of these low-molecular-weight polyolefins); and higher alcohols having a carbon number of not less than 6, ester oligomers, and fluorinated ethylene resins. These compounds may be used alone or in combination. The amount of the lubricant present on the pellets is typically not greater than 5 wt. %, preferably not greater than 1 wt. %, based on the weight of the EVOH resin composition.

The EVOH resin composition of the present disclosure may be prepared in any of various forms, e.g., in a pellet form, in a powdery form, or in a liquid form, for use as a forming material for various formed products. Particularly, the EVOH resin composition of the present disclosure is preferably provided as a melt-formable material, because the effects of the present disclosure can be more efficiently provided. The EVOH resin composition of the present disclosure may be a resin composition prepared by mixing the EVOH resin composition with a resin other than the EVOH resin (A).

Exemplary products to be formed from the EVOH resin composition of the present disclosure for practical applications include a single-layer film formed by using the EVOH resin composition of the present disclosure, and a multilayer structure including the layer formed by using the EVOH resin composition of the present disclosure.

Multilayer Structure

A multilayer structure of the present disclosure includes a layer formed from the EVOH resin composition of the present disclosure. The layer containing the EVOH resin composition of the present disclosure (hereinafter referred to simply as "EVOH resin composition layer") may be laminated with some other base material (hereinafter referred to simply as "base resin") containing a thermoplastic resin other than the EVOH resin composition of the present disclosure as a major component. Thus, the EVOH resin composition layer can be strengthened, protected from moisture and other influence, and/or imparted with an additional function.

Examples of the base resin include: (unmodified) polyolefin resins including polyethylene resins such as linear low-density polyethylenes, low-density polyethylenes, very-low-density polyethylenes, medium-density polyethylenes, high-density polyethylenes, ethylene-propylene (block and random) copolymers, and ethylene-α-olefin (C4 to C20 α-olefin) copolymers, polypropylene resins such as polypropylenes and propylene-α-olefin (C4 to C20 α-olefin) copolymers, polybutenes, polypentenes, and polycycloolefin resins (polymers having a cycloolefin structure in a main chain and/or a side chain thereof); polyolefin resins in a broader sense including modified olefin resins such as unsaturated carboxyl-modified polyolefin resins obtained by graft-modifying any of the aforementioned polyolefin resins with an unsaturated carboxylic acid or an unsaturated carboxylic acid ester; and ionomers, ethylene-vinyl acetate copolymers, ethylene-acrylic acid copolymers, ethylene-acrylate copolymers, polyester resins, polyamide resins (including polyamide copolymers), polyvinyl chlorides, polyvinylidene chlorides, acrylic resins, polystyrene resins, vinyl ester resins, polyester elastomers, polyurethane elastomers, polystyrene elastomers, halogenated polyolefins such as chlorinated polyethylenes and chlorinated polypropylenes, and aromatic and aliphatic polyketones.

Of these, the polyamide resins, the polyolefin resins, the polyester resins, and the polystyrene resins, which are hydrophobic resins, are preferred, and the polyolefin resins such as the polyethylene resins, the polypropylene resins, the polycycloolefin resins, and the unsaturated carboxyl-modified polyolefin resins obtained by modifying these polyolefin resins are more preferred.

Where EVOH resin composition layers a (a1, a2, . . . ) formed from the EVOH resin composition of the present disclosure and base resin layers b (b1, b2, . . . ) are laminated together to produce a multilayer structure, the layered configuration of the multilayer structure may be any combination of these layers, e.g., a/b, b/a/b, a/b/a, a1/a2/b, a/b1/b2, b2/b1/a/b1/b2, b2/b1/a/b1/a/b1/b2, or the like. Where the multilayer structure further includes a recycle layer R formed from a mixture obtained by re-melting cutoff pieces and defective products occurring during the production of the multilayer structure and containing the EVOH resin composition of the present disclosure and the thermoplastic resin other than the EVOH resin composition of the present disclosure, possible combinations of the layers for the layered configuration include b/R/a, b/R/a/b, b/R/a/R/b, b/a/R/a/b, b/R/a/R/a/R/b, and the like. The total number of the layers of the multilayer structure is typically 2 to 15, preferably 3 to 10. In the aforementioned layered configuration, as required, an adhesive resin layer containing an adhesive resin may be provided between the layers.

Known adhesive resins are usable as the adhesive resin. The adhesive resin is properly selected according to the type of the thermoplastic resin to be used for the base resin layers b. Typical examples of the adhesive resin include carboxyl-containing modified polyolefin polymers prepared by chemically bonding an unsaturated carboxylic acid or its anhydride to a polyolefin resin by an addition reaction, a graft reaction or the like. Examples of the carboxyl-containing modified polyolefin polymers include polyethylenes graft-modified with maleic anhydride, polypropylenes graft-modified with maleic anhydride, ethylene-propylene (block and random) copolymers graft-modified with maleic anhydride, ethylene-ethyl acrylate copolymers graft-modified with maleic anhydride, ethylene-vinyl acetate copolymers graft-modified with maleic anhydride, polycycloolefin resins modified with maleic anhydride, and polyolefin resins graft-modified with maleic anhydride. These adhesive resins may be each used alone, or two or more of these adhesive resins may be used as a mixture.

Where the adhesive resin layers are provided between the EVOH resin composition layer formed from the EVOH resin composition of the present disclosure and the base resin layers in the multilayer structure, the adhesive resin layers are present on opposite sides of the EVOH resin composition layer and, therefore, a highly hydrophobic adhesive resin is preferably used for the adhesive resin layers.

The base resin and the adhesive resin may each contain conventionally known plasticizer, filler, clay (montmorillonite or the like), colorant, antioxidant, antistatic agent, lubricant, nucleating agent, antiblocking agent, wax, and the like in amounts that do not impair the effects of the present disclosure (e.g., in amounts of not greater than 30 wt. %, preferably not greater than 10 wt. % of the resin). These may be used alone or in combination.

The EVOH resin composition layer formed from the EVOH resin composition of the present disclosure and the base resin layer may be laminated together (optionally with the adhesive resin layer provided therebetween) by a known laminating method. Examples of the laminating method include: a method in which a film or a sheet of the EVOH resin composition of the present disclosure is laminated with the base resin by melt extrusion; a method in which the base resin layer is laminated with the EVOH resin composition of the present disclosure by melt extrusion; a method in which the EVOH resin composition and the base resin are coextruded; a method in which the EVOH resin composition layer and the base resin layer are dry-laminated together with the use of a known adhesive agent such as of organic titanium compound, isocyanate compound, polyester compound or polyurethane compound; and a method in which a solution of the EVOH resin composition is applied on the base resin layer, and a solvent is removed from the applied solution. Of these methods, the coextrusion method is preferred from the viewpoint of costs and environmental concerns.

The multilayer structure described above may be further subjected to a (heat) stretching process as required. The stretching process may be a uniaxial stretching process or a biaxial stretching process. The biaxial stretching process may be a simultaneous stretching process or a sequential stretching process. Exemplary methods for the stretching process include roll stretching method, tenter stretching method, tubular stretching method, stretch blowing method, and vacuum pressure forming method each having a higher stretch ratio. A temperature for the stretching is close to the melting point of the multilayer structure, and is typically selected from a range of about 40° C. to about 170° C., preferably about 60° C. to about 160° C. If the stretching temperature is excessively low, the stretchability tends to be poorer. If the stretching temperature is excessively high, it tends to be difficult to ensure stable stretching.

The resulting multilayer structure may be further subjected to a heat-setting process to ensure dimensional stability after the stretching. The heat-setting process may be performed in a known manner. For example, the stretched film is typically heat-treated at 80° C. to 180° C., preferably 100° C. to 165° C., for about 2 to about 600 seconds, while being kept tense. Where the stretched multilayer film produced by using the EVOH resin composition of the present disclosure is used as a shrinkable film, the stretched film may be cold-set so as to be imparted with a heat-shrinkable property, for example, by applying cold air over the stretched film without performing the above heat-setting process.

In some case, a cup-shaped or tray-shaped multilayer container may be produced by using the multilayer structure of the present disclosure. In this case, a drawing process is typically employed. Specific examples of the drawing process include vacuum forming method, pressure forming method, vacuum pressure forming method, and plug-assisted vacuum pressure forming method. Where a tube-shaped or bottle-shaped multilayer container (laminate structure) is produced from a multilayer parison (a hollow tubular preform to be blown), a blow molding process is employed. Specific examples of the blow molding process include extrusion blow molding method (twin head type, mold shift type, parison shift type, rotary type, accumulator type, horizontal parison type, and the like), cold parison blow molding method, injection blow molding method, and biaxial stretching blow molding method (extrusion type cold parison biaxial stretching blow molding method, injection type cold parison biaxial stretching blow molding method, injection inline type biaxial stretching blow molding method, and the like). As required, the resulting multilayer structure may be subjected to heating process, cooling process, rolling process, printing process, dry laminating process, solution or melt coating process, bag forming process, deep drawing process, box forming process, tube forming process, splitting process, or the like.

The thickness of the multilayer structure (or the stretched multilayer structure) and the thicknesses of the EVOH resin composition layer, the base resin layer, and the adhesive resin layer of the multilayer structure vary depending upon the layered configuration, the type of the base resin, the type of the adhesive resin, and the use purpose, the package shape, the required physical properties, and the like of the multilayer structure. The thickness of the multilayer structure (or the stretched multilayer structure) is typically 10 to 5,000 μm, preferably 30 to 3,000 μm, particularly preferably 50 to 2,000 μm. The thickness of the EVOH resin composition layer is typically 1 to 500 μm, preferably 3 to 300 μm, particularly preferably 5 to 200 μm. The thickness of the base resin layer is typically 5 to 3,000 μm, preferably 10 to 2,000 μm, particularly preferably 20 to 1,000 μm. The thickness of the adhesive resin layer is typically 0.5 to 250 μm, preferably 1 to 150 μm, particularly preferably 3 to 100 μm.

The thickness ratio between the EVOH resin composition layer and the base resin layer of the multilayer structure (EVOH resin composition layer/base resin layer) (if these layers each include a plurality of layers, the thickness ratio between the thickest one of the EVOH resin composition layers and the thickest one of the base resin layers) is typically 1/99 to 50/50, preferably 5/95 to 45/55, particularly preferably 10/90 to 40/60. The thickness ratio between the EVOH resin composition layer and the adhesive resin layer of the multilayer structure (EVOH resin composition layer/adhesive resin layer) (if these layers each include a plurality of layers, the thickness ratio between the thickest one of the EVOH resin composition layers and the thickest one of the adhesive resin layers) is typically 10/90 to 99/1, preferably 20/80 to 95/5, particularly preferably 50/50 to 90/10.

Bags, cups, trays, tubes, bottles, and other containers, and caps produced from the film, the sheet or the stretched film formed in the aforementioned manner are useful as packaging material containers for general foods, condiments such as mayonnaise and dressing, fermented foods such as miso, fat and oil such as salad oil, beverages, cosmetics, pharmaceutical products, and the like.

In particular, the layer formed from the EVOH resin composition of the present disclosure is excellent in ultraviolet absorbability and, therefore, is particularly useful as a food packaging material, particularly, for packaging raw meat, ham, sausage and other meat products that are liable to be discolored due to ultraviolet radiation.

EXAMPLES

An embodiment of the present disclosure will hereinafter be described more specifically by way of an example thereof. However, it should be understood that the present disclosure be not limited to the example within the scope of the present disclosure.

In the following examples, "parts" means "parts by weight" unless otherwise specified.

Ultraviolet Absorbability

By using an EVOH resin composition, a water/isopropanol (4/6) solution containing the EVOH resin composition at a concentration of 5 wt. % was prepared. Then, the ultraviolet transmittance of the solution thus prepared was measured (at a wavelength of 300 nm) by UV-VIS SPECTROPHOTOMETER UV-2600 (available from Shimadzu Corporation). The measurement of the ultraviolet transmittance of the EVOH resin composition in a homogenous solution state makes it possible to evaluate the resin composition for intrinsic ultraviolet transmittance. A lower ultraviolet transmittance value means a higher ultraviolet absorbability.

Coloration

A 2-mm thick resin plate was produced by thermoforming an EVOH resin composition (at 210° C. with a melting period of 5 minutes and a pressing period of 30 seconds) by means of a manual hydraulic vacuum heat press (IMC-11FD-A available from Imoto Machinery Co., Ltd.) The YI value of the resin plate thus produced was measured by means of a spectrophotometer SE6000 available from Nippon Denshoku Industries Co., Ltd.

Heat Stability

By means of a thermogravimeter (PYRIS 1 TGA available from Perkin Elmer, Inc.), 5 mg of an EVOH resin composition was heated at a temperature increasing rate of 10° C./minute in a temperature range of 30° C. to 550° C. in a nitrogen atmosphere having a gas flow rate of 20 mL/minute, and a temperature at which the weight of the EVOH resin composition was reduced to 95% of the original weight was measured.

Example 1

An ethylene-vinyl alcohol copolymer having an ethylene structural unit content of 44 mol %, a saponification degree of 99.6 mol %, and an MFR of 12 g/10 minutes (as measured at 210° C. with a load of 2160 g) was used as the EVOH resin (A). An aqueous solution of acetic acid was added to a methanol solution of the EVOH resin (A) (having a resin concentration of 36 wt. %) so that acetic acid was present in a proportion of 1.5 parts based on 100 parts of the EVOH resin (A). The resulting methanol solution was fed through a gear pump, and extruded into strands in water from a round die head. Then, the strands were cut into cylindrical pellets.

The pellets thus produced were kept in contact with an acetic acid aqueous solution (having an acetic acid concentration of 2,200 ppm) at a bath ratio of 2.5 at 35° C. for 3 hours. Then, the resulting pellets were dried at 100° C. for 36 hours in a nitrogen stream. Thus, pellets of the EVOH resin (A) having an ethylene structural unit content of 44 mol %, a saponification degree of 99.6 mol %, and an MFR of 12 g/10 minutes (as measured at 210° C. with a load of 2160 g) were prepared.

Analysis of Iron Compound (C)

A sample was prepared by pulverizing the pellets of the EVOH resin (A), and 0.5 g of the sample was ashed in an infrared heating oven (in an oxygen stream at 650° C. for 1 hour). The resulting ash was dissolved in an acid, and the resulting solution was diluted to a predetermined volume with purified water, whereby a sample solution was prepared. The sample solution was analyzed by an ICP-MS (ICP mass spectrometer 7500ce available from Agilent Technologies, Inc.) through a standard addition method. As a result, the amount of the iron compound (C) was 0.1 ppm on a metal basis.

Then, 100 parts of the pellets of the EVOH resin (A) the EVOH resin pellets prepared in the aforementioned manner and 0.05 parts of trans-cinnamic acid (available from Wako Pure Chemical Industries, Ltd.) as a styrene derivative (B) were preheated at 210° C. for 5 minutes, and then melt-kneaded for 5 minutes by a plastograph (available from Brabender Corporation). The resulting kneaded mixture was cooled, and then pulverized, whereby an EVOH resin composition was prepared.

The EVOH resin composition was evaluated in the aforementioned manner. The results are shown below in Table 1.

Comparative Example 1

An EVOH resin composition was prepared in substantially the same manner as in Example 1, except that an ethylene-vinyl alcohol copolymer (in which the amount of the iron compound (C) was 0 ppm on a metal basis) having an ethylene structural unit content of 29 mol %, a saponification degree of 99.6 mol %, and an MFR of 3.9 g/10 minutes (as measured at 210° C. with a load of 2160 g) was used as the EVOH resin (A). The EVOH resin composition thus prepared was evaluated in the same manner. The results are shown below in Table 1.

Comparative Example 2

An EVOH resin composition was prepared by melt-kneading 100 parts of pellets of the same EVOH resin (A) as used in Example 1, 0.05 parts of trans-cinnamic acid (available from Wako Pure Chemical Industries, Ltd.) as a styrene derivative (B), and 0.0034 parts of iron (III) phosphate n-hydrate (available from Wako Pure Chemical Industries, Ltd., and having a drying loss of 20.9 wt. % when being dried at 230° C.) as an iron compound (C) at 210° C. for minutes by a plastograph (available from Brabender Corporation), cooling the resulting kneaded mixture, and pulverizing the mixture. The EVOH resin composition thus prepared was evaluated in the same manner. The results are shown below in Table 1.

Comparative Example 3

An EVOH resin composition was prepared in substantially the same manner as in Example 1, except that trans-cinnamic acid was not blended. The EVOH resin composition thus prepared was evaluated in the same manner. The results are shown below in Table 1.

Comparative Example 4

An EVOH resin composition was prepared in substantially the same manner as in Comparative Example 2, except that trans-cinnamic acid was not blended. The EVOH resin composition thus prepared was evaluated in the same manner. The results are shown below in Table 1.

contemplated that various modifications apparent to those skilled in the art could be made within the scope of the disclosure.

The EVOH resin composition of the present disclosure has ultraviolet absorbability even without a common ultraviolet absorbing agent blended therein, and is excellent in heat stability and less susceptible to coloration. Therefore, the EVOH resin composition of the present disclosure can be advantageously used for various packaging materials for various foods, condiments such as mayonnaise and dressing,

TABLE 1

| Styrene derivative (B) | Example 1 | Comparative Example 1 | Comparative Example 2 | Comparative Example 3 | Comparative Example 4 |
| --- | --- | --- | --- | --- | --- |
| Type | Cinnamic acid | Cinnamic acid | Cinnamic acid | — | — |
| Amount (ppm) | 500 | 500 | 500 | — | — |
| Amount (ppm) of iron compound (C) on metal basis | 0.1 | 0 | 10 | 0.1 | 10 |
| Amount of styrene derivative (B)/Amount of iron compound (C) on metal basis | 5,000 | — | 50 | — | — |
| Ultraviolet transmittance (%) | 2.5 | 5.0 | 1.6 | 34.3 | 27.0 |
| Coloration YI value | 10 | 35 | 16 | 10 | 11 |
| Heat stability (° C.) | 386 | 358 | 384 | 375 | 386 |

Comparison between the EVOH resin compositions of Comparative Examples 3 and 4 each containing the iron compound (C) but not containing the styrene derivative (B) indicates that the ultraviolet absorbability and the heat stability were improved proportionally with the amount of the iron compound (C). Comparison between the EVOH resin compositions of Comparative Examples 2 and 4 indicates that the EVOH resin composition containing 10 ppm of the iron compound (C) and the styrene derivative (B) in combination had superior ultraviolet absorbability and comparable heat stability, but suffered from heat coloration with a higher YI value.

In contrast, the EVOH resin composition of Example 1 was comparable in ultraviolet absorbability to the EVOH resin composition of Comparative Example 2 and, in addition, was less susceptible to coloration and improved in heat stability, though containing the iron compound (C) in a very small amount of 1 ppm. On the other hand, the EVOH resin composition of Comparative Example 1 containing the styrene derivative (B) but not containing the iron compound (C) was poorer in ultraviolet absorbability than the EVOH resin composition of Example 1. Further, the EVOH resin composition of Comparative Example 1 was more susceptible to the heat coloration with a higher YI value, and poorer in heat stability than the EVOH resin composition of Example 1.

Comparison between the EVOH resin compositions of Comparative Examples 3 and 4 not containing the styrene derivative (B) indicates that the heat stability was deteriorated as the amount of the iron compound (C) was reduced. In the case of the EVOH resin composition of Example 1 containing the styrene derivative (B), in contrast, the heat stability was not deteriorated, but unexpectedly improved even with the amount of the iron compound (C) reduced. This effect can be provided only by using the styrene derivative (B) and a very small amount of the iron compound (C) in combination.

While a specific form of the embodiment of the present disclosure has been shown in the aforementioned example, the example is merely illustrative but not limitative. It is fermented foods such as miso, fat and oil such as salad oil, beverages, cosmetics, pharmaceutical products, and the like.

The invention claimed is:

1. An ethylene-vinyl alcohol copolymer composition comprising:
   (A) an ethylene-vinyl alcohol copolymer;
   (B) a styrene derivative; and
   (C) an iron compound;
   wherein the ethylene-vinyl alcohol copolymer (A) has an ethylene structural unit content of 20 to 60 mol %;
   wherein the styrene derivative (B) is present in an amount of from greater than 10 ppm to 1,000 ppm based on the weight of the ethylene-vinyl alcohol copolymer composition; and
   wherein the iron compound (C) is present in an amount of 0.01 to less than 0.2 ppm on a metal basis based on a weight of the ethylene-vinyl alcohol copolymer composition.

2. An ethylene-vinyl alcohol copolymer composition comprising:
   (A) an ethylene-vinyl alcohol copolymer;
   (B) a styrene derivative; and
   (C) an iron compound;
   wherein the ethylene-vinyl alcohol copolymer (A) has an ethylene structural unit content of 20 to 60 mol %;
   wherein the iron compound (C) is present in an amount of 0.01 to less than 0.2 ppm on a metal basis based on a weight of the ethylene-vinyl alcohol copolymer composition; and
   wherein a weight ratio of the amount of the styrene derivative (B) to the amount of the iron compound (C) on a metal basis is from greater than 50 to 50,000.

3. Pellets comprising the ethylene-vinyl alcohol copolymer composition according to claim 1.

4. A multilayer structure comprising a layer that comprises the ethylene-vinyl alcohol copolymer composition according to claim 1.

5. Pellets comprising the ethylene-vinyl alcohol copolymer composition according to claim 2.

6. A multilayer structure comprising a layer that comprises the ethylene-vinyl alcohol copolymer composition according to claim 2.

\* \* \* \* \*